(12) United States Patent
Li

(10) Patent No.: US 11,546,682 B2
(45) Date of Patent: Jan. 3, 2023

(54) METHOD AND SYSTEM FOR SYNCHRONOUS AUDIO PLAYBACK OF TWS EARPHONES

(71) Applicants: VeriSilicon Microelectronics (Shanghai) Co., Ltd., Shanghai (CN); VeriSilicon Holdings Co., Ltd., Cayman Islands (KY)

(72) Inventor: Shuai Li, Shanghai (CN)

(73) Assignees: VeriSilicon Microelectronics (Shanghai) Co., Ltd., Shanghai (CN); VeriSilicon Holdings Co., Ltd., Grand Cayman (KY)

( * ) Notice: Subject to any disclaimer, the term of this patent is extended or adjusted under 35 U.S.C. 154(b) by 0 days.

(21) Appl. No.: 17/355,131

(22) Filed: Jun. 22, 2021

(65) Prior Publication Data

US 2021/0400367 A1 Dec. 23, 2021

(30) Foreign Application Priority Data

Jun. 22, 2020 (CN) .......................... 202010573173.8

(51) Int. Cl.
*H04R 1/10* (2006.01)
(52) U.S. Cl.
CPC ........... *H04R 1/10* (2013.01); *H04R 2420/07* (2013.01)
(58) Field of Classification Search
CPC .......... H04R 1/00; H04R 1/10; H04R 1/1016; H04R 2420/07; H04R 5/033; H04R 5/02; H04R 5/04; H04R 2205/022; H04R 2201/10; H04R 2201/103; H04R 2201/40; H04S 1/005

USPC .......................... 381/74, 309, 311, 370, 380
See application file for complete search history.

(56) References Cited

U.S. PATENT DOCUMENTS

| | | | |
|---|---|---|---|
| 7,768,981 B1 * | 8/2010 | Donovan ................. | H04W 4/80 455/208 |
| 10,200,803 B1 * | 2/2019 | Tong ........................ | H04S 1/005 |
| 10,750,459 B2 * | 8/2020 | Girardier ............ | H04W 56/001 |
| 2018/0331724 A1 * | 11/2018 | Li .......................... | H04B 5/0006 |
| 2019/0261089 A1 * | 8/2019 | Hariharan .............. | H04R 1/406 |

(Continued)

FOREIGN PATENT DOCUMENTS

| | | | | |
|---|---|---|---|---|
| CN | 109565772 A | * | 4/2019 | ............ H04J 3/0638 |
| CN | 111698672 A | * | 9/2020 | ............... H04R 1/10 |

(Continued)

*Primary Examiner* — Ahmad F. Matar
*Assistant Examiner* — Sabrina Diaz

(57) ABSTRACT

The present disclosure provides a method and system for synchronous audio playback of TWS earphones, The TWS earphones include a master earphone and a slave earphone; both the master earphone and the slave earphone include a first timer, a second timer, an audio DAC, and an audio playback phase-locked loop; the first timer and the second timer of the master earphone are respectively used to collect a real-time audio playback position of the master earphone and a public Bluetooth clock; the first timer and the second timer of the slave earphone are respectively used to collect a real-time audio playback position of the slave earphone and a local Bluetooth clock; the slave earphone calibrates audio data in the audio DAC, and the first timer and the audio playback phase-locked loop of the slave earphone, to achieve synchronization between the master earphone and the slave earphone.

10 Claims, 5 Drawing Sheets

(56) References Cited

U.S. PATENT DOCUMENTS

| | | | | |
|---|---|---|---|---|
| 2021/0067874 A1* | 3/2021 | Xu | ............................ | H04R 3/12 |
| 2021/0119716 A1* | 4/2021 | Yang | ...................... | H04L 7/0012 |
| 2021/0337498 A1* | 10/2021 | Lee | ....................... | H04L 7/0008 |

FOREIGN PATENT DOCUMENTS

| | | | | |
|---|---|---|---|---|
| CN | 111885553 A | * | 11/2020 | ........ H04W 36/0055 |
| CN | 111416673 B | * | 9/2021 | ............. H04B 17/30 |

* cited by examiner

METHOD AND SYSTEM FOR SYNCHRONOUS AUDIO PLAYBACK OF TWS EARPHONES

CROSS REFERENCE TO RELATED APPLICATION

The present application claims the benefit of priority to Chinese Patent Application No. CN 2020105731738, entitled "METHOD AND SYSTEM FOR SYNCHRONOUS AUDIO PLAYBACK OF TWS EARPHONES, TWS EARPHONES", filed with CNIPA on Jun. 22, 2020, the disclosure of which is incorporated herein by reference in its entirety.

FIELD OF TECHNOLOGY

The present disclosure generally relates to wireless earphones, and in particular, in particular to a method and system for synchronous audio playback of true wireless stereo (TWS) earphones, and TWS earphones.

BACKGROUND

With the development of Bluetooth technology and the widespread use of Bluetooth products, Bluetooth wireless earphones are becoming a necessity for everyday life. TWS earphones not only get rid of the physical wire between traditional earphones and audio source, but also get rid of the physical connection between the two earpieces of the traditional Bluetooth earphones. Therefore, TWS earphones are favored by consumers and their market is growing rapidly.

Like traditional Bluetooth earphones, TWS earphones use wireless Bluetooth communication technology to send audio data from the audio source to the two earpieces. The difference is that the two earpieces of TWS earphones receive audio data separately. Due to the varying degrees of the delay in the wireless transmission of audio data to the left and right earphones, there is a synchronization problem between the left and right earpieces of the TWS earphones. Therefore, how to achieve precise synchronization of the left and right earphones during music playback has become an urgent problem to be solved.

SUMMARY

The present disclosure provides a method and system for audio synchronous playback of TWS earphones, and TWS earphones. By adjusting a timer and a phase-locked loop of master and slave earphones, precise and synchronous audio playback of TWS earphones is realized, which greatly improves the user experience.

The TWS earphones include a master earphone and a slave earphone. Both the master earphone and the slave earphone include a first timer, a second timer, an audio digital to analog converter (DAC), and an audio playback phase-locked loop; the first timer and the audio DAC of the master earphone are driven by a clock source provided by the audio playback phase locked loop of the master earphone; The first timer and the second timer of the master earphone are respectively used to collect a real-time audio playback position of the master earphone and a public Bluetooth clock; the first timer and audio DAC of the slave earphone are driven by a clock source provided by the audio playback phase-locked loop of the slave earphone; the first timer and the second timer of the slave earphone are respectively used to collect a real-time audio playback position of the slave earphone and a local Bluetooth clock; the method for synchronous audio playback of the TWS earphones as applied to the slave earphone comprises: establishing a Bluetooth connection with the master earphone, and calculating a frequency deviation coefficient of the local Bluetooth clock compared to the public Bluetooth clock; when the master earphone and the slave earphone receive audio data sent by an audio source, receiving a first timer value of the master earphone and a second timer value of the master earphone sent by the master earphone in real time based on a preset time interval; based on the frequency deviation coefficient, the first timer value of the master earphone, the second timer value of the master earphone, and a first timer value of the slave earphone and a second timer value of the slave earphone at the corresponding time, calculating a calibrated second timer value and a playback calibration value of the slave earphone compared to the master earphone, calibrating the audio data in the audio DAC and the first timer of the slave earphone based on the playback calibration value; based on two first timer values of the master earphone obtained in succession, two second timer values of the master earphone obtained in succession, two corresponding first timer values of the slave earphone obtained in succession, and two calibrated second timer values of the slave earphone obtained in succession, calculating a frequency deviation of the audio playback phase-locked loop of the slave earphone compared to the audio playback phase-locked loop of the master earphone, and adjusting the audio playback phase-locked loop of the slave earphone based on the frequency deviation until the master earphone and the slave earphone are synchronized.

calculating the frequency deviation coefficient of the local Bluetooth clock compared to the public Bluetooth clock according to $\text{delta\_f\_bt}=(RT1\_recv-RT1\_initial)/(LT1\_send-LT1\_initial)$, wherein $RT1\_initial$ and $LT1\_initial$ are respectively an initial second timer value of the slave earphone and an initial second timer value of the master earphone after the master earphone and the slave earphone establish a Bluetooth connection, wherein $RT1\_RECV$ is the second timer value of the slave earphone when the slave earphone initially receives data during data interaction between the master and slave earphones, and $LT1\_SEND$ is the second timer value of the master earphone when the master earphone initially sends data during the data interaction.

In an embodiment of the present disclosure, the calibrated second timer value of the slave earphone is calculated according to $RT1\_cur\_m=LT1\_initial+(RT1\_cur-RT1\_initial)*\text{delta\_f\_bt}$, wherein $\text{delta\_f\_bt}$ is the frequency deviation coefficient, $RT1\_initial$ is the initial second timer value of the slave earphone after the Bluetooth connection is established between the master earphone and the slave earphone, $LT1\_initial$ is the initial second timer value of the master earphone, and $RT1\_cur$ represents a real time second timer value of the slave earphone In an embodiment of the present disclosure, the playback calibration value of the slave earphone compared to the master earphone is calculated based on $\text{delta\_t}=RT0\_cur-LT0\_cur-(RT1\_cur\_m-LT1\_cur)$, wherein $RT0\_cur$ and $RT1\_cur\_m$ are respectively a real time first timer value of the slave earphone and a real time calibrated second timer value of the slave earphone, wherein $LT0\_cur$ and $LT1\_cur$ are respectively a real time first timer value of the master earphone and a real time second timer value of the master earphone.

In an embodiment of the present disclosure, the calibrating the audio data in the audio DAC and the first timer of the slave earphone based on the playback calibration value comprises:

when the playback calibration value is greater than zero, copying a preset count of audio sample data to be sent to the audio DAC of the slave earphone, wherein the preset count is determined based on delta_s=Floor(delta_t*SampleRate), delta_t is the playback calibration value, SampleRate is the sampling rate of the audio data, and Floor is the round-down operation;

when the playback correction value is less than zero, deleting the preset count of the audio sample data to be sent to the audio DAC of the slave earphone;

calculating a calibrated value of the slave earphone based on real_delta_t=delta_s/SampleRate, and modifying the first timer of the slave earphone according to calibrated value of the slave earphone.

In an embodiment of the present disclosure, the frequency deviation of the audio playback phase-locked loop of the slave earphone compared to the audio playback phase-locked loop of the master earphone is calculated based on $$delta\_f\_aud = delta\_f\_aud\_l / delta\_f\_aud\_r;$$

wherein delta_f_aud_l=(LT0_cur-LT0_old)/(LT1_cur-LT1_old), and delta_f_aud_r=(RT0_cur-RT0_old)/(RT1_cur_m-RT1_old_m), wherein LT0_old, LT0_cur, LT1_cur are respectively the two first timer values of the master earphone obtained twice in succession, and the two second timer values of the master earphone obtained in succession, wherein RT0_old, RT0_cur, RT1_cur_m are respectively the two first timer values of the slave earphone obtained twice in succession and the two calibrated second timer values of the slave earphone obtained in succession.

In an embodiment of the present disclosure, when adjusting the audio playback phase-locked loop of the slave earphone based on the frequency deviation, when the frequency deviation is greater than a preset threshold, the slave earphone speeds up the audio playback phase-locked loop of the slave earphone, wherein when the frequency deviation is less than the preset threshold, the slave earphone slows down the audio playback phase-locked loop of the slave earphone.

The present disclosure provides TWS earphones, which include a master earphone and a slave earphone.

The master earphone includes a first timer, a second timer, an audio DAC, and an audio playback phase-locked loop; the first timer and audio DAC of the master earphone are all clocks provided by the master earphone's audio playback phase-locked loop Source-driven; the first timer and the second timer of the master earphone are respectively used to collect the real-time audio playback position of the master earphone and the public Bluetooth clock; the master earphone is used to establish a Bluetooth connection with the slave earphone, and Receiving the first timer value of the master earphone and the second timer value of the master earphone sent by the master earphone in real time based on a preset time interval.

The slave earphone includes a first timer, a second timer, an audio DAC, and an audio playback phase-locked loop, wherein the first timer and audio DAC of the slave earphone are driven by a clock source provided by the audio playback phase locked loop of the slave earphone, wherein the first timer and the second timer of the slave earphone are respectively used to collect a real-time audio playback position of the slave earphone and a local Bluetooth clock.

The slave earphone also comprises a processor and a memory, the memory is used to store a computer program; the processor is used to execute the computer program stored in the memory, so that the slave earphone executes the above mentioned method for synchronous audio playback of TWS earphones.

Finally, the present disclosure provides a system for synchronous audio playback of TWS earphones, including the above-mentioned TWS earphones and audio source. The audio source is connected to the TWS earphones via Bluetooth, and is used to send audio data to the TWS earphones.

In an embodiment of the present disclosure, the audio source sends the audio data to the master earphone and the slave earphone simultaneously; or the audio source sends the audio data to the master earphone, and the master earphone then forwards the audio data to the slave earphone.

As mentioned above, the method and system for synchronous audio playback of TWS earphones and TWS earphones of the present disclosure have the following beneficial effects:

(1) basic audio synchronization of TWS earphones is realized by adjusting and the first timer and audio data in an audio data buffer sent by the slave earphone to the audio DAC;

(2) precise audio synchronization of TWS earphones is realized by adjusting the audio playback phase-locked loop of the master and slave earphones;

(3) Limitations brought by the wire connection of wired earphones are removed without harming the user's listening experience.

Figure 1:
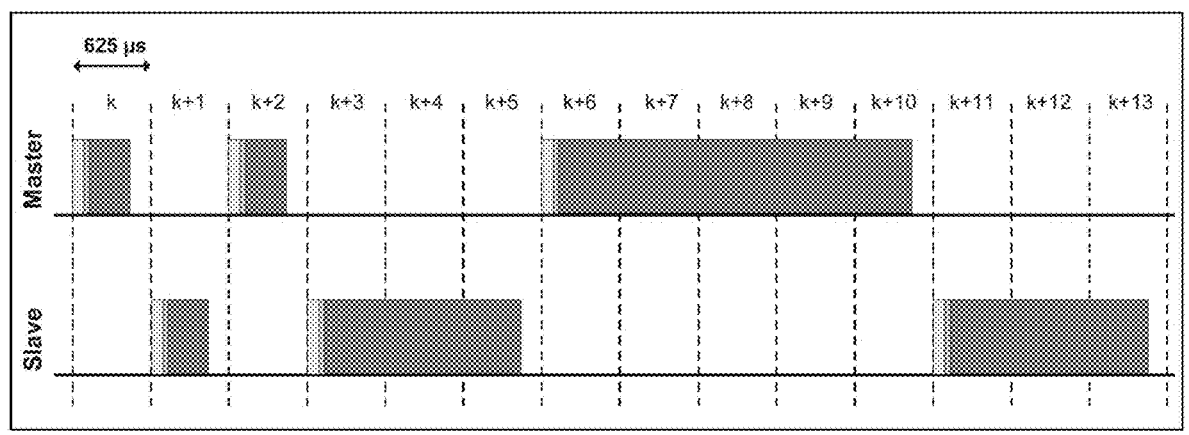
FIG. 1 shows a schematic diagram of data transmission between a master earphone and a slave earphone according to one embodiment of the present disclosure.

| Reference Numerals | |
|---|---|
| 51 | Master Earphone |
| 52 | Slave Earphone |
| 61 | TWS Earphones |
| 62 | Audio Source |

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

The method and system for synchronous audio playback of TWS earphones, and TWS earphones of the present disclosure, adjust the timers and phase-locked loops of the master and slave earphones to achieve precise synchronization of audio playback of the TWS earphones, which greatly improves user experience.

The TWS earphones include a master earphone and a slave earphone, wherein the master earphone can communicate with an audio source, the slave earphone can communicate with the master earphone and the master earphone and the slave earphone can provide playback of audio data from the audio source. Specifically, the master earphone and the slave earphone need to be paired with each other. The communication protocol between the master earphone and the slave earphone can be a standard Bluetooth protocol or a non-Bluetooth protocol. The master earphone and the audio source establish a standard Bluetooth connection.

When the audio source plays audio, the master earphone acquires Bluetooth parameters for establishing a Bluetooth connection with the audio source, and subsequently receives data packets sent by the audio source based on the Bluetooth parameters. The slave earphone acquires Bluetooth parameters from the master earphone and establishes a Bluetooth connection with the audio source to receive data packets sent by the audio source based on the Bluetooth parameters without the need of the master earphone forwarding the packets. If the slave earphone does not acquire the Bluetooth parameters from the master earphone, the master earphone may forward the data packets acquired from the audio source to the slave earphone. The audio source is used to provide audio data. In one embodiment, the audio source includes one or more of a smart phone, a smart speaker, an IPAD, and a personal computer.

A "slot" represents the minimum transceiver switching interval between master and slave devices in Bluetooth technology, which is 625 us. When the master and slave Bluetooth devices establish a connection, the master device sends its own slot serial number to the slave device, the slave device records the serial number, and the slave device, as well as the master device, increases the slot serial number by one every 625 us. The slot serial number is also an index value for controlling frequency hopping of the master and slave Bluetooth devices according to an agreed frequency hopping sequence.

In the present disclosure, the TWS earphones include a master earphone and a slave earphone. The master earphone and the slave earphone are connected by Bluetooth to form a Piconet network. As shown in FIG. 1, in the Piconet network, the master earphone sends data to the slave earphone at 625 us*(2n) of the Bluetooth clock, and the slave earphone should send data at 625 us*(2n+1) of the Bluetooth clock, wherein n is a positive integer. It should be noted that the master earphone is usually a left earphone, and the slave earphone is usually a right earphone. For those skilled in the art, the above allocation method of the master earphone and slave earphone is not limiting, and the left earphone and the right earphone can swap with each other as needed.

Figure 2:
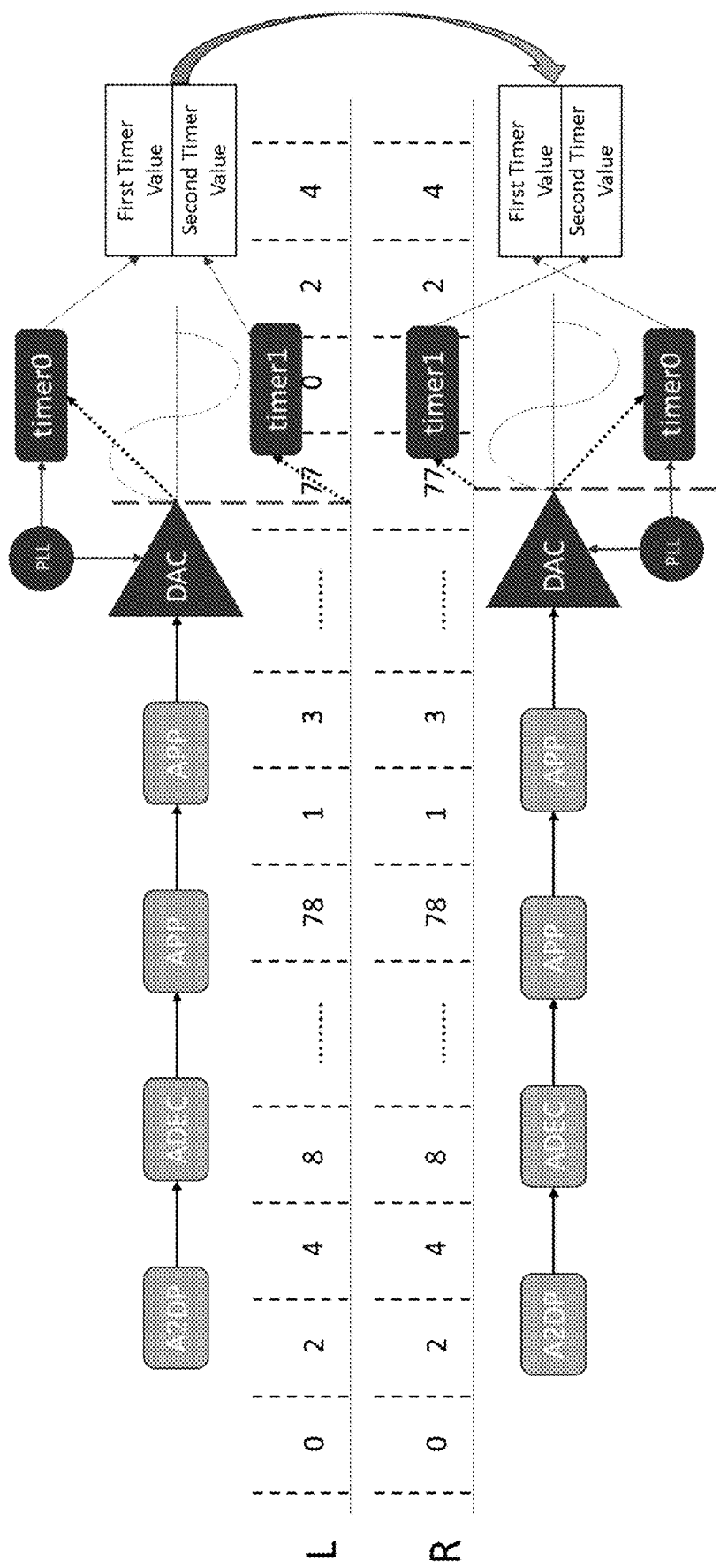
FIG. 2 shows a schematic diagram of audio playback of a master earphone and a slave earphone according to one embodiment of the present disclosure.

As shown in FIG. 2, for the audio data sent by the audio source, the master earphone (L) and the slave earphone (R) sequentially process received audio data by: distributing the data through Advanced Audio Distribution Profile (A2DP), decoding the data through an audio decoder (ADEC) decoding, processing the audio data through audio post processing (APP), converting and then outputting the data through a digital analog converter (DAC).

Both the master earphone and the slave earphone include a first timer (timer0), a second timer (timer1), an audio DAC, and an audio playback phase locked loop (PLL). The first timer and audio DAC of the master earphone are both driven by a clock source provided by the audio playback phase-locked loop of the master earphone; the first timer and the second timer of the master earphone are respectively used to collect a real time audio playback position of the master earphone and a public Bluetooth clock. That is, the first timer value and the second timer value of the master earphone respectively represent the real-time audio playback position of the master earphone and the public Bluetooth clock.

The first timer and the audio DAC of the slave earphone are both driven by a clock source provided by the audio playback phase-locked loop of the slave earphone; the first timer and the second timer of the slave earphone are respectively used to collect a real time audio playback location of the slave earphone and a local Bluetooth clock. That is, the first timer value and the second timer value of the slave earphone respectively represent the real time audio playback position of the slave earphone and the local Bluetooth clock. It should be noted that the first timer and the audio DAC share the same audio playback phase locked loop.

Figure 3:
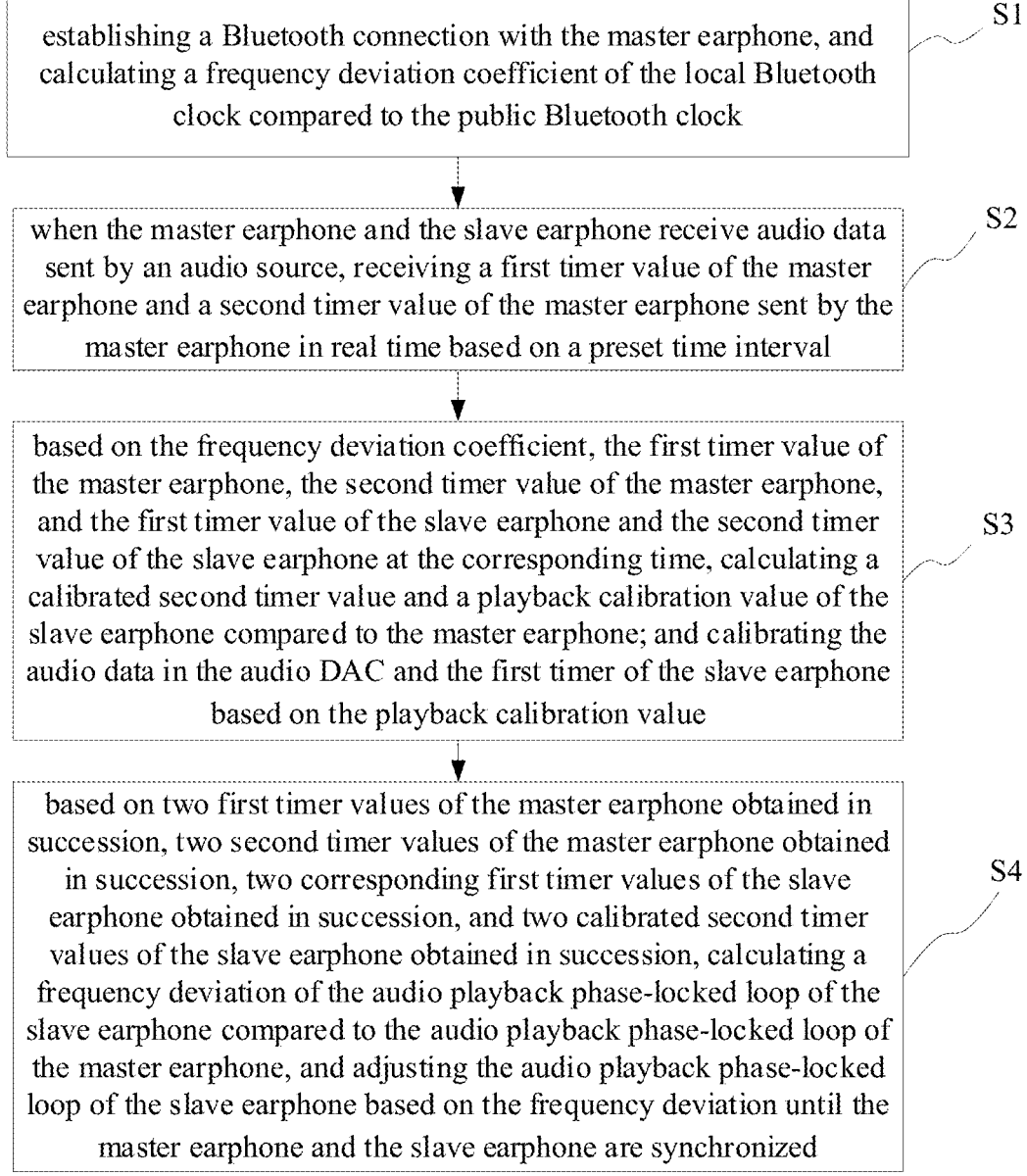
FIG. 3 shows a flow chart of a method for synchronous audio playback of TWS earphones according to one embodiment of the present disclosure.
Figure 4:
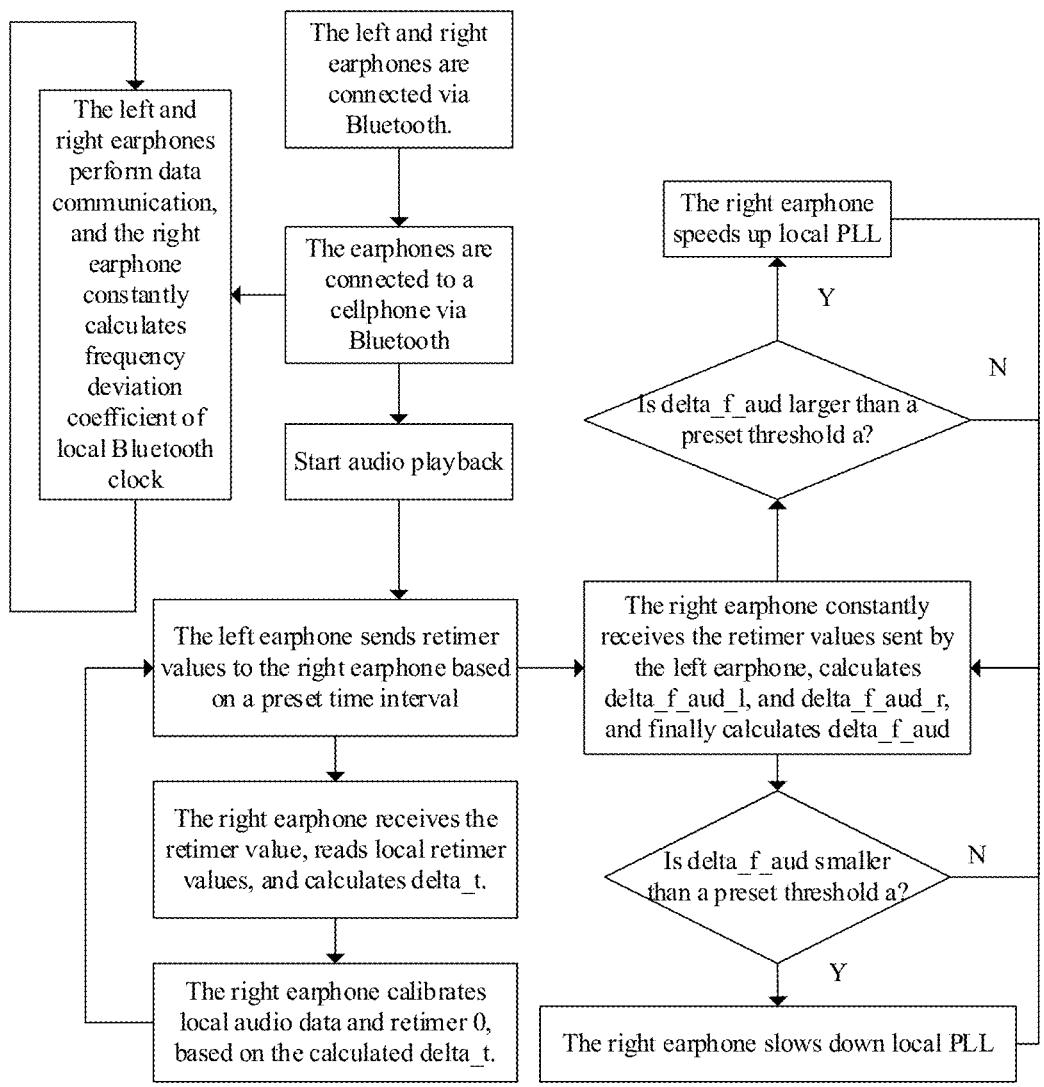
FIG. 4 is a structural diagram of a method for synchronous audio playback of TWS earphones in an embodiment of the present disclosure.
Figure 5:
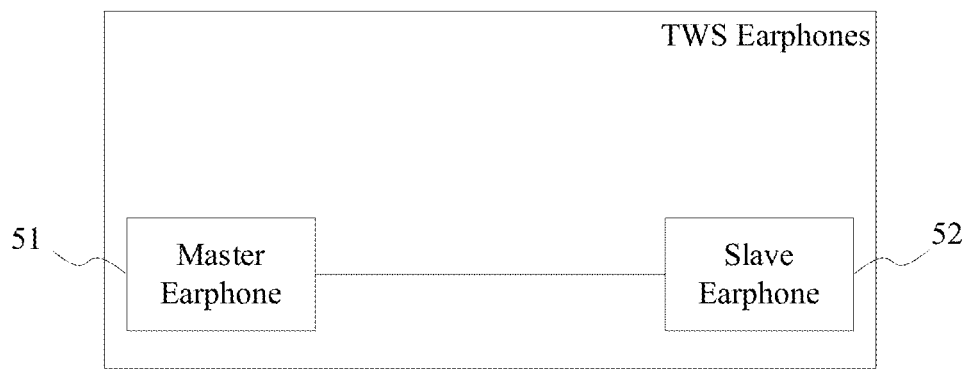
FIG. 5 shows a structural diagram of an embodiment of TWS earphones of the present disclosure.

As shown in FIGS. 3 and 4, in one embodiment, the method for synchronous audio playback of TWS earphones of the present disclosure is applied to the slave earphone, and includes the following steps:

S1: establishing a Bluetooth connection with the master earphone, and calculating a frequency deviation coefficient of the local Bluetooth clock compared to the public Bluetooth clock.

Specifically, the master earphone and the slave earphone are connected via Bluetooth to form a Piconet network. After the slot serial numbers of the master earphone and the slave earphone are synchronized, the slave earphone records its second timer value at this time as RT1_initial, and calculates the second timer value LT1_initial of the master earphone at a corresponding time, based on the initial Slot serial number.

The master earphone and the slave earphone perform data interaction when they need to transmit information, and each time the slave earphone receives a data packet from the master earphone, the slave earphone calculates a second timer value RT1_recv corresponding to an initial receiving moment of the data packet, and obtain a second timer value LT1_send of the master earphone based on the Slot serial number corresponding to an initial sending moment of the data packet.

In one embodiment of the present disclosure, the frequency deviation coefficient of the local Bluetooth clock compared to the public Bluetooth clock is calculated according to delta_f_bt=(RT1_recv−RT1_initial)/(LT1_send−LT1_initial), wherein RT1_initial and LT1_initial are respectively an initial second timer value of the slave earphone and an initial second timer value of the master earphone after the master earphone and the slave earphone establish a Bluetooth connection, wherein RT1_RECV is the second timer value of the slave earphone when the slave earphone initially receives data during data interaction between the master and slave earphones, and LT1_SEND is the second timer value of the master earphone when the master earphone initially sends data during the data interaction.

S2: when the master earphone and the slave earphone receive audio data sent by an audio source, receiving a first timer value of the master earphone and a second timer value of the master earphone sent by the master earphone in real time based on a preset time interval.

Specifically, the master earphone and the slave earphone each start audio playback after receiving audio data. When the master earphone and the slave earphone each start audio playback, their respective first timers are started. The first timers are responsible for recording current audio playback positions, with an accuracy of 1 timing unit. After starting the playback, the audio playback of the master earphone and the slave earphone is not synchronous at first. The master earphone reads its own first timer value LT0_cur and second timer value LT1_cur in real time at the same time at a preset time interval, such as 200 ms, and sends them to the slave earphone.

S3: based on the frequency deviation coefficient, the first timer value of the master earphone, the second timer value of the master earphone, and the first timer value of the slave earphone and the second timer value of the slave earphone at the corresponding time, calculating a calibrated second timer value and a playback calibration value of the slave earphone compared to the master earphone; and calibrating the audio data in the audio DAC and the first timer of the slave earphone based on the playback calibration value.

In an embodiment of the present disclosure, the calibrated second timer value of the slave earphone is calculated according to RT1_cur_m=LT1_initial+(RT1_cur−RT1_initial)*delta_f_bt, wherein delta_f_bt is the frequency deviation coefficient, RT1_initial is the initial second timer value of the slave earphone after the Bluetooth connection is established between the master earphone and the slave earphone, LT1_initial is the initial second timer value of the master earphone, and RT1_cur represents a real time second timer value of the slave earphone.

Specifically, after the slave earphone receives the first timer value LT0_cur and the second timer value LT1_cur sent by the master earphone, it reads the first timer value RT0_cur of the slave earphone and the second timer correction value RT1_cur_m of the slave earphone, and calculates the playback correction value of the slave earphone compared to the master earphone according to $$delta\_t=RT0\_cur-LT0\_cur-(RT1\_cur\_m-LT1\_cur).$$

In an embodiment of the present disclosure, the calibrating the audio data in the audio DAC and the first timer of the slave earphone based on the playback calibration value comprises:

31) when the playback calibration value is greater than zero, copying a preset count of audio sample data to be sent to the audio DAC of the slave earphone, wherein the preset count is determined based on delta_s=Floor (delta_t*SampleRate), wherein delta_t is the playback calibration value, SampleRate is the sampling rate of the audio data, and Floor is the round-down operation;

Specifically, when the playback calibration value is greater than zero, it indicates that the audio playback position of the slave earphone is ahead of the master earphone. At this time, the preset count of delta_s of buffered audio sample data that will be sent to the audio buffer of the audio DAC can be copied.

32) when the playback correction value is less than zero, deleting the preset count of the audio sample data to be sent to the audio DAC of the slave earphone;

When the playback calibration value is less than 0, it indicates that the audio playback position of the slave earphone is behind the master earphone. At this time, the preset count of delta_s of buffered audio sample data that will be sent to the audio buffer of the audio DAC can be deleted.

33) calculating a calibrated value of the slave earphone based on real_delta_t=delta_s/SampleRate, and modifying the first timer of the slave earphone according to the calibrated value of the slave earphone.

After the modification, the master earphone and the slave earphone realize basic audio synchronization.

S4: based on two first timer values of the master earphone obtained in succession, two second timer values of the master earphone obtained in succession, two corresponding first timer values of the slave earphone obtained in succession, and two calibrated second timer values of the slave earphone obtained in succession, calculating a frequency deviation of the audio playback phase-locked loop of the slave earphone compared to the audio playback phase-locked loop of the master earphone, and adjusting the audio playback phase-locked loop of the slave earphone based on the frequency deviation until the master earphone and the slave earphone are synchronized.

Specifically, the right earphone stores the LT0_cur, LT1_cur, RT0_cur, and RT1_cur_m obtained in the foregoing processes as LT0_old, RT0_old, RT1_old_m, and then acquires new LT0_cur, LT1_cur, RT0_cur, RT1_cur_m.

In an embodiment of the present disclosure, according to delta_f_aud=delta_f_aud_l/delta_f_aud_r, the frequency deviation of the audio playback phase-locked loop of the slave earphone compared to the audio playback phase-locked loop of the master earphone is calculated; wherein, delta_f_aud_l=(LT0_cur−LT0_old)/(LT1_cur−LT1_old) represents the frequency deviation of the audio playback of the master earphone compared to the Bluetooth clock, delta_f_aud_r=(RT0_cur−RT0_old)/(RT1_cur_m−RT1_old_m) represents the frequency deviation of the audio playback of the slave earphone compared to the Bluetooth clock.

When adjusting the audio playback phase-locked loop of the slave earphone based on the frequency deviation, when the frequency deviation is greater than a preset threshold, the slave earphone speeds up the audio playback phase-locked loop of the slave earphone, wherein when the frequency deviation is less than the preset threshold, the slave earphone slows down the audio playback phase-locked loop of the slave earphone. Repeat the steps of adjusting the audio playback phase lock loop of the slave earphone several times until the master earphone and the slave earphone are synchronized, that is, a precise synchronization of the master earphone and the slave earphone is realized.

As shown in FIG. 4, in one embodiment, the TWS earphones of the present disclosure include a master earphone 51 and a slave earphone 52.

The master earphone 51 includes a first timer, a second timer, an audio DAC, and an audio playback phase-locked loop; the first timer and audio DAC of the master earphone are all driven by a clock source provided by the audio playback phase-locked loop of the master earphone; the first timer and the second timer of the master earphone are respectively used to collect a real-time audio playback position of the master earphone and a public Bluetooth clock; the master earphone is used to establish a Bluetooth connection with the slave earphone, and receive a first timer value of the master earphone and a second timer value of the master earphone sent by the master earphone in real time based on a preset time interval.

The slave earphone 52 includes a first timer, a second timer, an audio DAC, and an audio playback phase-locked loop, wherein the first timer and audio DAC of the slave earphone are driven by a clock source provided by the audio playback phase locked loop of the slave earphone, wherein the first timer and the second timer of the slave earphone are respectively used to collect a real-time audio playback position of the slave earphone and a local Bluetooth clock.

The slave earphone also comprises a processor and a memory, the memory is used to store a computer program, and the processor is used to execute the computer program stored in the memory, so that the slave earphone executes the above-mentioned method for synchronous audio playback of TWS earphones. The memory may be a ROM, RAM, magnetic disk, USB flash disk, memory card, optical disk, or other media that can store program codes. The processor may be a general-purpose processor, for example, a central processing unit (CPU for short), a network processor (NP), etc.; it may also be a Digital Signal Processing (DSP), Application Specific Integrated Circuit (ASIC), Field-Programmable Gate Array (FPGA), other programming logic devices, discrete gates or transistor logic devices, or discrete hardware components.

Figure 6:
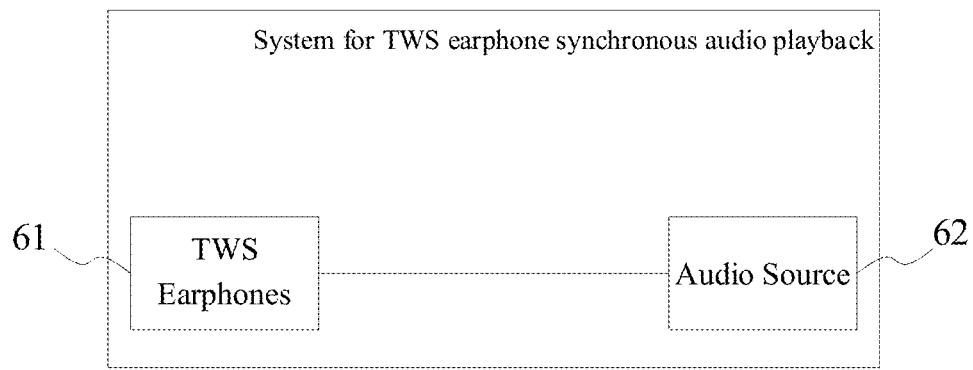
FIG. 6 is a structural diagram of a system for audio synchronous playback of TWS earphones according to one embodiment of the present disclosure.

As shown in FIG. 6, in one embodiment, the system for synchronous audio playback of TWS earphones of the present disclosure includes the above-mentioned TWS earphones 61 and audio source 62.

The audio source 62 is connected to the TWS earphones 61 by Bluetooth, and is used to send audio data to the TWS earphones 61.

In an embodiment of the present disclosure, the audio source 62 sends the audio data to the master earphone and the slave earphone at the same time; or the audio source 62 sends the audio data to the master earphone, and the master earphone then forwards the audio data to the slave earphone.

In summary, the method and system for synchronous audio playback of TWS earphones and TWS earphones of the present disclosure realize basic audio synchronization of TWS earphones by adjusting and the first timer and audio data in an audio data buffer sent by the slave earphone to the audio DAC, and realize precise audio synchronization of TWS earphones by adjusting the audio playback phase-locked loop of the master and slave earphones. Limitations brought by the wire connection of wired earphones are removed without harming the user's listening experience, which greatly improves the user experience. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Anyone familiar with this technology can modify or change the above-mentioned embodiments without departing from the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A method for synchronous audio playback of TWS earphones, wherein the TWS earphones include a master earphone and a slave earphone, wherein both the master earphone and the slave earphone include a first timer, a second timer, an audio digital to analog converter (DAC), and an audio playback phase-locked loop, wherein the first timer and the audio DAC of the master earphone are driven by a clock source provided by the audio playback phase locked loop of the master earphone, wherein the first timer and the second timer of the master earphone are respectively used to collect a real-time audio playback position of the master earphone and a public Bluetooth clock, wherein the first timer and the audio DAC of the slave earphone are driven by a clock source provided by the audio playback phase locked loop of the slave earphone, wherein the first timer and the second timer of the slave earphone are respectively used to collect a real-time audio playback position of the slave earphone and a local Bluetooth clock, wherein the method for synchronous audio playback of the TWS earphones as applied to the slave earphone comprises:

establishing a Bluetooth connection with the master earphone, and calculating a frequency deviation coefficient of the local Bluetooth clock compared to the public Bluetooth clock;

when the master earphone and the slave earphone receive audio data sent by an audio source, receiving a first timer value of the master earphone and a second timer value of the master earphone sent by the master earphone in real time based on a preset time interval;

based on the frequency deviation coefficient, the first timer value of the master earphone, the second timer value of the master earphone, and a first timer value of the slave earphone and second timer value of the slave earphone at the corresponding time, calculating a calibrated second timer value and a playback calibration value of the slave earphone compared to the master earphone, calibrating the audio data in the audio DAC and the first timer of the slave earphone based on the playback calibration value; and based on two first timer values of the master earphone obtained in succession, two second timer values of the master earphone obtained in succession, two corresponding first timer values of the slave earphone obtained in succession, and two calibrated second timer values of the slave earphone obtained in succession, calculating a frequency deviation of the audio playback phase-locked loop of the slave earphone compared to the audio playback phase-locked loop of the master earphone, and adjusting the audio playback phase-locked loop of the slave earphone based on the frequency deviation until the master earphone and the slave earphone are synchronized.

2. The method for synchronous audio playback of TWS earphones according to claim 1, further comprising:

calculating the frequency deviation coefficient of the local Bluetooth clock compared to the public Bluetooth clock according to delta_$f\_bt$=($RT1\_recv$−$RT1\_initial$)/($LT1\_send$−$LT1\_initial$), wherein RT1_initial and LT1_initial are respectively an initial second timer value of the slave earphone and an initial second timer value of the master earphone after the master earphone and the slave earphone establish the Bluetooth connection, and wherein RT1_RECV is the second timer value of the slave earphone when the slave earphone initially receives data during data interaction between the master and slave earphones, and LT1_SEND is the second timer value of the master earphone when the master earphone initially sends data during the data interaction.

3. The method for synchronous audio playback of TWS earphones according to claim 1, further comprising:
calculating the calibrated second timer value of the slave earphone based on $$RT1\_cur\_m = LT1\_initial + (RT1\_cur - RT1\_initial)/delta\_f\_bt,$$

wherein delta_f_bt is the frequency deviation coefficient, RT1_initial is an initial second timer value of the slave earphone after the Bluetooth connection is established between the master earphone and the slave earphone, LT1_initial is an initial second timer value of the master earphone after the Bluetooth connection is established between the master earphone, and the slave earphone, and RT1_cur represents a real time second timer value of the slave earphone.

4. The method for synchronous audio playback of TWS earphones according to claim 1, further comprising:
calculating the playback calibration value of the slave earphone compared to the master earphone based on $$delta\_t = RT0\_cur - LT0\_cur - (RT1\_cur\_m - LT1\_cur),$$

wherein RT0_cur and RT1_cur_m are respectively a real time first timer value of the slave earphone and a real time calibrated second timer value of the slave earphone, and
wherein LT0_cur and LT1_cur are respectively a real time first timer value of the master earphone and a real time second timer value of the master earphone.

5. The method for synchronous audio playback of TWS earphones according to claim 1, wherein the calibrating the audio data in the audio DAC and the first timer of the slave earphone based on the playback calibration value comprises:
when the playback calibration value is greater than zero, copying a preset count of audio sample data to be sent to the audio DAC of the slave earphone, wherein the preset count is determined based on delta_s=Floor (delta_t*SampleRate), delta_t is the playback calibration value, SampleRate is the sampling rate of the audio data, and Floor is the round-down operation;
when the playback calibration value is less than zero, deleting the preset count of the audio sample data to be sent to the audio DAC of the slave earphone; and
calculating a calibrated value of the slave earphone based on real_delta_t=delta_s/SampleRate, and modifying the first timer of the slave earphone according to the calibrated value of the slave earphone.

6. The method for synchronous audio playback of TWS earphones according to claim 1, further comprising:
calculating the frequency deviation of the audio playback phase-locked loop of the slave earphone compared to the audio playback phase-locked loop of the master earphone based on $$delta\_f\_aud = delta\_f\_aud\_l/delta\_f\_aud\_r;$$

wherein $$delta\_f\_aud\_l = (LT0\_cur - LT0\_old)/(LT1\_cur - LT1\_old), \text{ and}$$

$$delta\_f\_aud\_r = (RT0\_cur - RT0\_old)/(RT1\_cur\_m - RT1\_old\_m),$$

wherein LT0_old, LT1_old, LT0_cur, LT1_cur are respectively the two first timer values of the master earphone obtained twice in succession, and the two second timer values of the master earphone obtained in succession, and
wherein RT0_old, RT1_old_m, RT0_cur, RT1_cur_m are respectively the two first timer values of the slave earphone obtained twice in succession and the two calibrated second timer values of the slave earphone obtained in succession.

7. The method for synchronous audio playback of TWS earphones according to claim 1, wherein when adjusting the audio playback phase-locked loop of the slave earphone based on the frequency deviation,
when the frequency deviation is greater than a preset threshold, the slave earphone speeds up the audio playback phase-locked loop of the slave earphone, and
when the frequency deviation is less than the preset threshold, the slave earphone slows down the audio playback phase-locked loop of the slave earphone.

8. TWS earphones, comprising a master earphone and a slave earphone,
wherein the master earphone includes a first timer, a second timer, an audio DAC, and an audio playback phase-locked loop, and the first timer and the audio DAC of the master earphone are both driven by a clock source provided by the audio playback phase-locked loop of the master earphone, wherein the first timer and the second timer of the master earphone are respectively used to collect a real-time audio playback position of the master earphone and a public Bluetooth clock, wherein the slave earphone is used to establish a Bluetooth connection with the master earphone, and receive a first timer value of the master earphone and a second timer value of the master earphone sent by the master earphone in real time based on a preset time interval,
wherein the slave earphone includes a first timer, a second timer, an audio DAC, and an audio playback phase-locked loop, wherein the first timer and audio DAC of the slave earphone are driven by a clock source provided by the audio playback phase locked loop of the slave earphone, wherein the first timer and the second timer of the slave earphone are respectively used to collect a real time audio playback position of the slave earphone and a local Bluetooth clock,
wherein the slave earphone also comprises a processor and a memory, the memory is used to store a computer program, and the processor is used to execute the computer program stored in the memory, so that the slave earphone executes a method for synchronous audio playback of TWS earphones,
wherein the method comprises:
establishing a Bluetooth connection with the master earphone, and calculating a frequency deviation coefficient of the local Bluetooth clock compared to the public Bluetooth clock;
when the master earphone and the slave earphone receive audio data sent by an audio source, receiving the first timer value of the master earphone and the second timer value of the master earphone sent by the master earphone in real time based on the preset time interval;
based on the frequency deviation coefficient, the first timer value of the master earphone, the second timer value of the master earphone, and a first timer value of the slave earphone and second timer value of the slave earphone at the corresponding time, calculating a calibrated second timer value and a playback calibration value of the slave earphone compared to the master earphone, calibrating the audio data in the audio DAC and the first timer of the slave earphone based on the playback calibration value; and based on two first timer values of the master earphone obtained in succession, two second timer values of the master earphone obtained in succession, two corresponding first timer values of the slave earphone obtained in succession, and two calibrated second timer values of the slave earphone obtained in succession, calculating a frequency deviation of the audio playback phase-locked loop of the slave earphone compared to the audio playback phase-locked loop of the master earphone, and adjusting the audio playback phase-locked loop of the slave earphone based on the frequency deviation until the master earphone and the slave earphone are synchronized.

9. A system for synchronous audio playback of TWS earphones, comprising TWS earphones and an audio source,
wherein the TWS earphones include a master earphone and a slave earphone, the audio source is connected to the TWS earphones via Bluetooth, and is used to send audio data to the TWS earphones,
wherein the master earphone includes a first timer, a second timer, an audio DAC, and an audio playback phase-locked loop, and the first timer and the audio DAC of the master earphone are both driven by a clock source provided by the audio playback phase-locked loop of the master earphone, wherein the first timer and the second timer of the master earphone are respectively used to collect a real-time audio playback position of the master earphone and a public Bluetooth clock, wherein the slave earphone is used to establish a Bluetooth connection with the master earphone, and receive a first timer value of the master earphone and a second timer value of the master earphone sent by the master earphone in real time based on a preset time interval,
wherein the slave earphone includes a first timer, a second timer, an audio DAC, and an audio playback phase-locked loop, wherein the first timer and audio DAC of the slave earphone are driven by a clock source provided by the audio playback phase locked loop of the slave earphone, wherein the first timer and the second timer of the slave earphone are respectively used to collect a real time audio playback position of the slave earphone and a local Bluetooth clock, wherein the slave earphone also comprises a processor and a memory, the memory is used to store a computer program, and the processor is used to execute the computer program stored in the memory, so that the slave earphone executes a method for synchronous audio playback of TWS earphones,
wherein the method comprises:
establishing a Bluetooth connection with the master earphone, and calculating a frequency deviation coefficient of the local Bluetooth clock compared to the public Bluetooth clock;

when the master earphone and the slave earphone receive audio data sent by the audio source, receiving the first timer value of the master earphone and the second timer value of the master earphone sent by the master earphone in real time based on the preset time interval;

based on the frequency deviation coefficient, the first timer value of the master earphone, the second timer value of the master earphone, and a first timer value of the slave earphone and second timer value of the slave earphone at the corresponding time, calculating a calibrated second timer value and a playback calibration value of the slave earphone compared to the master earphone, calibrating the audio data in the audio DAC and the first timer of the slave earphone based on the playback calibration value; and based on two first timer values of the master earphone obtained in succession, two second timer values of the master earphone obtained in succession, two corresponding first timer values of the slave earphone obtained in succession, and two calibrated second timer values of the slave earphone obtained in succession, calculating a frequency deviation of the audio playback phase-locked loop of the slave earphone compared to the audio playback phase-locked loop of the master earphone, and adjusting the audio playback phase-locked loop of the slave earphone based on the frequency deviation until the master earphone and the slave earphone are synchronized.

10. The system for synchronous audio playback of TWS earphones according to claim 9, wherein
the audio source sends the audio data to the master earphone and the slave earphone at the same time; or
the audio source sends the audio data to the master earphone, and the master earphone forwards the audio data to the slave earphone.

* * * * *